United States Patent Office 3,440,029
Patented Apr. 22, 1969

3,440,029
GASOLINE CONTAINING ANTI-ICING ADDITIVE
John C. Little and James P. West, Midland, Mich., assignors to The Dow Chemical Company, Midland, Mich., a corporation of Delaware
No Drawing. Filed May 20, 1964, Ser. No. 369,018
Int. Cl. C10l 1/22; C07c 91/16
U.S. Cl. 44—75       2 Claims This invention relates to gasolines containing an anti-icing additive to inhibit engine stalling.

The stalling of gasolines due to carburetor icing in cool, humid weather is a well known phenomenon and various fuel additives have been proposed to inhibit such stalling (see, for instance, U.S. Patents 3,115,397, 3,115,399 and 3,115,400).

The present invention provides a new and highly effective class of anti-icing additives for use in gasoline which otherwise might promote carburetor icing and resultant engine stalling. These additives are gasoline-soluble compounds having the formula

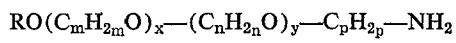
$$RO(C_mH_{2m}O)_x-(C_nH_{2n}O)_y-C_pH_{2p}-NH_2$$

wherein R is a hydrocarbon radical of 8–24 carbon atoms, $m$, $n$ and $p$ are integers 2–4, and $x$ and $y$ are integers 0–40, their sum being 0–50.

The preferred additives are these having the above formula wherein R contains 12–18 carbon atoms, $m$ and $p$ are 2–3, $x$ is 0–20 and $y$ is zero.

Many of the compounds having the above formula are known and the others can be made by substitution of the appropriate reactants in known processes. Thus, in general, the compounds can be conveniently made by condensing a hydroxy compound, ROH, with an alkylene oxide, $C_mH_{2m}O$, or a mixture of such oxides, then, optionally, with a second alkylene oxide, $C_nH_{2n}O$, or mixture, and finally attaching the terminal amino group by either reductive amination (U.S. Patents 2,754,330 and 2,928,877) or by cyanoethylation followed by hydrogenation (U.S. Patent 2,280,792; Nystrom and Brone, J. Am. Chem. Soc., 70, 3738 (1948)). According to another synthesis, ROH or an oxyalkylated derivative thereof is reacted with bis(2-chloroethyl)ether and alkali to make a chlorine-terminated compound. The latter is then reacted with ammonia to produce the amine-terminated final product. Other syntheses will be obvious to those skilled in the art.

In choosing the particular compound to be used it is preferable to maintain a balance between the hydrophobic and the hydrophylic moieties therein. Thus, when R is highly hydrophobic, $m$ and $n$ should be mostly or exclusively 2; i.e., oxyethylene radicals should predominate. Also, the number of such groups is preferably at least 4. On the other hand, when R is less hydrophobic, the oxyalkylene radicals are preferably less hydrophylic in nature; i.e., they are predominantly oxypropylene and/or oxybutylene, with at most a small proportion of oxyethylene radicals.

In addition to being effective carburetor de-icers, the additives of the invention have the further advantages that they are compatible with other gasoline additives, such as anti-knock additives, antioxidants, corrosion inhibitors and the like, they are not readily extracted by contact with water and they do not readily form gasoline-water emulsions. The latter properties are particularly valuable because gasoline ordinarily comes in contact with water during its handling and storage.

The practice of the invention is illustrated by the following examples.

PREPARATION OF ADDITIVES

The hydroxy compound, ROH, was condensed with alkylene oxide in the desired proportion by the use of NaOH as a catalyst, this being a well known procedure. The oxyalkylated material was then cyanoethylated by reaction with acrylonitrile in a well known reaction as described, for instance, by Bruson in U.S. Patent 2,280,792. The cyanoethyl ether was then hydrogenated with Ru on C or with Raney nickel at about 100–125° C. and a hydrogen pressure of 700–1400 p.s.i. Solvents used were methanol or aqueous ammonia (28%).

Several gasoline additives were evaluated in a 6-cylinder automobile engine to which the fuel and saturated air (100% humidity) were fed at 40° F. The carburetor was insulated to prevent its being warmed by engine heat. The fuel was a commercial straight-run gasoline to which was added 15% of isopentane and 5% of butane. It had an ASTM boiling range of 10% at 110° F., 50% at 167° F. and 90% at 260° F.

The "IPA Rating" is an arbitrary scale based on the effectiveness of isopropyl alcohol as a de-icer. The concentration of isopropyl alcohol which gave the maximum protection was 1.5% by volume, and this was set at 100. Thus, a rating of 50 means that the compound at the concentration shown was half as effective as 1.5% of isopropyl alcohol, a rating of 200 means twice the effectiveness, etc.

In the test itself, after the engine was started cold, it was operated for 30 seconds at 2000 r.p.m. and then 30 seconds at idle to constitute one cycle. Without stopping the engine these high speed-low speed cycles of one mintute each were repeated until stalling occurred. The larger the number of cycles that could be repeated without stalling, the higher the IPA rating. Thus, with no additive, the engine stalled after the first cycle, 1% isopropyl alcohol gave 3 cycles before stalling and 1.5% isopropyl alcohol gave 5 cycles before stalling. A maximum of 14 cycles were run. At a concentration of 200 p.p.m., the compound $C_9H_{19}C_6H_4O(C_2H_4O)_4(CH_2)_3NH_2$, prevented stalling through all 14 cycles and it was thus given a rating of 230+, indicating that it was greater than 2.3 times as effective as 1.5% isopropyl alcohol.

Results of these tests are shown in Table I.

TABLE I.—EFFECTIVENESS OF ADDITIVES $RO(C_mH_{2m}O)_x-(C_nH_{2n}O)_y-C_pH_{2p}-NH_2$

| Example | Additive | | | | | | IPA rating at concentration shown | | | | | | | |
| --- | --- | --- | --- | --- | --- | --- | --- | --- | --- | --- | --- | --- | --- | --- |
| | R | m | x | n | y | p | 2% | 1.5% | 1.0% | 0.5% | 200 p.p.m. | 100 p.p.m. | 50 p.p.m. | 25 p.p.m. | 12.5 p.p.m. |
| 1 | Nonylphenyl | 2 | 4 | | 0 | 3 | | | | | 230+ | 170 | 110 | 93 | 67 |
| 2 | n-Octadecyl | | 0 | | 0 | 3 | | | | | 140 | 87 | 80 | 47 | |
| 3 | Isopropyl alcohol | | | | | | 80 | 100 | 67 | 33 | | | | | |

Several typical amine additives of the invention were evaluated as carburetor-icing inhibitors by adding them to a gasoline fuel having pronounced tendency to cause carburetor-icing and then feeding the fuel composition to a bench-mounted carburetor operated by suction from an air aspirator. This apparatus permitted close control of flow rates, temperatures, humidity, etc. and included a wire screen upon which the ice collected. The pressure drop across this screen was continuously indicated by a manometer and was a convenient indicator of the degree of icing produced with each fuel. By holding all other variables constant and feeding successive portions of the same gasoline containing a different additive in each portion, a direct comparison of the effectiveness of the various additives was made. The results of such tests, in which air at 37° F. and 90% relative humidity was used, are shown in Table II. The numerical ratings are based on an arbitrary numerical scale 1–10 wherein the fuel with no additive rated 2 and that containing 1.5% of isopropyl alcohol rated 5.

TABLE II.—EFFECTIVENESS OF ADDITIVES $RO(C_mH_{2m}O)_x—(C_nH_{2n}O)_y—C_pH_{2p}—NH_2$

| Example | Additive | | | | | Rating[1] at concentration shown, p.p.m. | | | |
|---|---|---|---|---|---|---|---|---|---|
| | R | m | x | n | y | p | 200 | 100 | 50 | 25 |
| 4 | Octylphenyl | 2 | 1 | — | 0 | 3 | 10 | — | 7 | — |
| 5 | Nonylphenyl | 2 | 2 | — | 0 | 3 | 10 | — | 5 | — |
| 6 | do | 2 | 4 | — | 0 | 3 | 10 | 10 | 7 | 5 |
| 7 | do | 2 | 9 | — | 0 | 3 | 10 | 10 | 7 | 5 |
| 8 | do | 2 | 20 | — | 0 | 3 | 8 | — | — | — |
| 9 | do | 2 | 3 | — | 0 | 2 | — | 6 | — | — |
| 10 | do | 2 | 5 | — | 0 | 2 | — | 7 | — | — |
| 11 | n-Hexyl | — | 0 | — | 0 | 3 | 8 | — | 3 | — |
| 12 | n-Decyl | — | 0 | — | 0 | 3 | 10 | — | 6 | — |
| 13 | n-Dodecyl | — | 0 | — | 0 | 3 | 8 | — | 6 | — |
| 14 | n-Octadecyl | — | 0 | — | 0 | 3 | 8 | 7 | 3 | — |
| 15 | n-Dodecyl | 2 | 4.5 | — | 0 | 3 | 9 | 8 | 2 | — |
| 16 | do | 2 | 9.5 | — | 0 | 3 | 10 | 7 | — | — |

[1] The dashes indicate that no test was run.

In additives of the above formula wherein $y$ is greater than zero, it is generally preferred that $m$ be 3 or 4, that $n$ be 2 and that $y$ exceed $x$. While it is preferred that R be alkylphenyl or alkyl, it may also be phenylalkyl or other hydrocarbon. Table III shows some typical compounds having the above formula that are effective as gasoline anti-icing additives.

TABLE III

| R | m | x | n | y | p |
|---|---|---|---|---|---|
| Octylphenyl | 3 | 3 | 2 | 5 | 3 |
| Dodecylphenyl | 4 | 2 | 2 | 6 | 2 |
| Pentadecylphenyl | 2 | 25 | — | 0 | 4 |
| Octadecylphenyl | 2 | 40 | — | 0 | 3 |
| Nonyl | 4 | 5 | 2 | 15 | 2 |
| Nonyl | 3 | 15 | 2 | 30 | 3 |
| Pentadecyl | 3 | 8 | 2 | 20 | 4 |
| Phenyl | 4 | 6 | 2 | 10 | 3 |
| Benzyl | 3 | 3 | 2 | 12 | 2 |
| Phenethyl | 2 | 10 | 3 | 1 | 3 |
| 4-octylbenzyl | 2 | 16 | — | 0 | 3 |

In the additives of the invention the configuration of the alkyl and alkylene radicals is of little significance. Thus, they may be primary, secondary or tertiary, straight-chain or branched-chain. Similarly, in the alkylphenyl derivatives it matters little whether the alkyl radical is in the ortho, meta or para position.

We claim:

1. An improved gasoline motor fuel composition comprising:
    (1) a major proportion of a gasoline that normally tends to promote stalling of internal combustion engines by carburetor icing, and
    (2) a small but effective proportion of a gasoline-soluble anti-icing additive having the formula $$RO(C_2H_4O)_x—C_3H_6—NH_2$$

wherein R is an alkylphenyl radical containing 14–18 carbon atoms and $x$ is 1–20.

2. The composition of claim 1 wherein the alkylphenyl radical is nonylphenyl and $x$ is 4.

References Cited

UNITED STATES PATENTS 3,063,819 11/1962 Watt et al. _____ 44—72
3,115,400 12/1963 Marsh et al. _____ 44—72
3,238,277 3/1966 Sigan et al. _____ 44—56

DANIEL E. WYMAN, *Primary Examiner.*

W. H. CANNON, *Assistant Examiner.*

U.S. Cl. X.R.

44—72; 260—570.6, 584